US012608350B2

(12) United States Patent
Lee et al.

(10) Patent No.:  US 12,608,350 B2
(45) Date of Patent:      Apr. 21, 2026

(54) AI-POWERED CONCEPT-DRIVEN VISUALIZATION AUTHORING

(71) Applicant: Microsoft Technology Licensing, LLC, Redmond, WA (US)

(72) Inventors: Bongshin Lee, Issaquah, WA (US); Chenglong Wang, Bellevue, WA (US); John Roger Thompson, Atlanta, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/337,891

(22) Filed: Jun. 20, 2023

(65) Prior Publication Data

US 2024/0427745 A1      Dec. 26, 2024

(51) Int. Cl.
| *G06F 16/215* | (2019.01) |
| *G06N 3/02* | (2006.01) |
| *G06N 3/0475* | (2023.01) |

(52) U.S. Cl.
CPC ............. *G06F 16/215* (2019.01); *G06N 3/02* (2013.01); *G06N 3/0475* (2023.01)

(58) Field of Classification Search
None
See application file for complete search history.

(56) References Cited

U.S. PATENT DOCUMENTS

| 8,412,747 | B1 | 4/2013 | Harik | |
| 10,437,870 | B2 * | 10/2019 | Franceschini | ......... G06F 16/951 |

| 11,742,092 | B2 * | 8/2023 | Murrish | ................ G06F 16/951 |
| | | | | 707/600 |
| 2007/0203923 | A1 | 8/2007 | Thomas | |
| 2008/0133505 | A1 * | 6/2008 | Bayley | .................... G06F 16/34 |
| | | | | 707/999.005 |
| 2012/0290988 | A1 | 11/2012 | Sun et al. | |
| 2018/0293517 | A1 * | 10/2018 | Browne | ................ G06N 3/105 |
| 2020/0097602 | A1 * | 3/2020 | Ristoski | ................ G06N 3/045 |
| 2021/0074308 | A1 * | 3/2021 | Skordilis | ............... G06N 3/045 |
| 2021/0264113 | A1 * | 8/2021 | Beller | .................... G06F 40/30 |

(Continued)

FOREIGN PATENT DOCUMENTS

| DE | 102021004562 A1 * | 5/2022 | ........... G06F 16/243 |
| WO | WO-2019044064 A1 * | 3/2019 | ............. G06F 16/00 |

(Continued)

OTHER PUBLICATIONS

Ellis K, et al. Dreamcoder: Bootstrapping inductive program synthesis with wake-sleep library learning. InProceedings of the 42nd acm sigplan international conference on programming language design and implementation Jun. 19, 2021 (pp. 835-850) (Year: 2021).*

(Continued)

*Primary Examiner* — Uyen T Le
(74) *Attorney, Agent, or Firm* — Alleman Hall LLP

(57) ABSTRACT

A method, computer program product, and computing system for processing a request to generate a visualization concerning a plurality of data concepts. A new data concept for the visualization is generated by transforming an existing data concept using a program synthesizer and a generative model. The visualization is rendered by processing a mapping of the new data concept to a visual channel of the visualization.

8 Claims, 12 Drawing Sheets

(56) References Cited

U.S. PATENT DOCUMENTS

| | | | | |
|---|---|---|---|---|
| 2021/0406774 A1* | 12/2021 | Browne | ............... | G06F 16/951 |
| 2022/0365910 A1 | 11/2022 | He et al. | | |
| 2023/0162023 A1* | 5/2023 | Koike Akino | ....... | G06N 3/0455 |
| | | | | 706/25 |
| 2023/0186111 A1* | 6/2023 | Mohandoss | ........ | G06Q 30/0201 |
| | | | | 706/50 |

FOREIGN PATENT DOCUMENTS

| | | | | |
|---|---|---|---|---|
| WO | WO-2019155052 A1 * | 8/2019 | ............ | G06F 30/20 |
| WO | 2021163282 A1 | 8/2021 | | |
| WO | WO-2023225891 A1 * | 11/2023 | | |

OTHER PUBLICATIONS

Hu Y, Chapman A, Wen G, Hall DW. What can knowledge bring to machine learning ?—a survey of low-shot learning for structured data. ACM Transactions on Intelligent Systems and Technology (TIST). Mar. 3, 2022;13(3):1-45. (Year: 2022).*

Kozaczynski W, Ning J, Engberts A. Program concept recognition and transformation. IEEE Transactions on Software Engineering. Dec. 1992;18(12):1065-75. (Year: 1992).*

Tian Y, Wang Y, Gavrilova ML, Ruhe G. A formal knowledge representation system for the cognitive learning engine. InIEEE 10th International Conference on Cognitive Informatics and Cognitive Computing (ICCI-CC'11) Aug. 18, 2011 (pp. 23-32). IEEE. (Year: 2011).*

Walker N. Invention Concept Latent Spaces for Analogical Ideation. InIFIP International Conference on Artificial Intelligence Applications and Innovations Jun. 10, 2022 (pp. 313-324). Cham: Springer International Publishing. (Year: 2022).*

Maceachren, Alan M., Mark Gahegan, and William Pike. "Visualization for constructing and sharing geo-scientific concepts." Proceedings of the National Academy of Sciences 101.suppl_1 (2004): 5279-5286. (Year: 2004).*

Datta, Srayan, and Eytan Adar. "A generative model for scientific concept hierarchies." Plos one 13.2 (2018): e0193331 (Year: 2018).*

Zong, et al., "Lyra 2: Designing interactive visualizations by demonstration", In Journal of IEEE Transactions on Visualization and Computer Graphics, vol. 27, Issue 2, Oct. 13, 2020, pp. 1-11.

Xiong, et al., "Revealing the semantics of data wrangling scripts with comantics", In Journal of IEEE Transactions on Visualization and Computer Graphics ( vol. 29, Issue: 1, Jan. 2023, pp. 117-127.

Yan, et al., "Auto-Suggest: Learning-to-Recommend Data Preparation Steps using Data Science Notebooks", In Proceedings of the ACM SIGMOD International Conference on Management of Data, Jun. 11, 2020, pp. 1539-1554.

Zhang, et al., "Interpretable Program Synthesis", In Proceedings of the CHI Conference on Human Factors in Computing Systems, May 8, 2021, 16 Pages.

Zong, et al., "Animated Vega-Lite: Unifying Animation with a Grammar of Interactive Graphics", In Journal of IEEE Transactions on Visualization and Computer Graphics, vol. 29, Issue: 1, Jan. 2023, pp. 149-159.

"Pandas-dev/pandas: Pandas", Retrieved from: https://zenodo.org/record/7857418#.ZGRqE3ZBw2w, Apr. 24, 2023, 5 Pages.

Barke, et al., "Grounded Copilot: How Programmers Interact with Code-Generating Models", In Repository of arXiv:2206.15000v1, Jun. 30, 2022, 24 Pages.

Barman, et al., "Ringer: Web Automation by Demonstration", In Proceedings of ACM SIGPLAN International conference on Object-Oriented Programming, Systems, Languages, and Applications, Nov. 2, 2016, pp. 748-764.

Bartram, et al., "Untidy Data: The Unreasonable Effectiveness of Tables", In Repository of arXiv:2106.15005v1, Jun. 28, 2021, 11 Pages.

Bostock, et al., "D3 Data-Driven Documents", In Journal of IEEE Transactions on Visualization and Computer Graphics, vol. 17, Issue 12, Dec. 2011, pp. 2301-2309.

Bostock, et al., "Protovis: A Graphical Toolkit for Visualization", In Proceedings of IEEE Transactions on Visualization and Computer Graphics, vol. 15, Issue 6, Nov. 2009, pp. 1121-1128.

Chaudhuri, et al., "Neurosymbolic programming", In Journal of Foundations and Trends® in Programming Languages, vol. 7, Issue 3, Dec. 8, 2021, 86 Page.

Chen, et al., "Evaluating Large Language Models Trained on Code", In Repository of arXiv:2107.03374v1, Jul. 7, 2021, 35 Pages.

Chen, et al., "Type-directed synthesis of visualizations from natural language queries", In Proceedings of the ACM on Programming Languages, vol. 6, Oct. 31, 2022, 28 Pages.

Chowdhery, et al., "PaLM: Scaling Language Modeling with Pathways", In Repository of arXiv:2204.02311v1, Apr. 5, 2022, 83 Pages.

Fried, et al., "Incoder: A generative model for code infilling and synthesis", In Repository of arXiv:2204.05999v1, Apr. 12, 2022, 25 Pages.

Gulwani, et al., "Program Synthesis", In Journal of Foundations and Trends in Programming Languages, vol. 4, Issue 1-2, Jul. 11, 2017, 127 Pages.

Hendrycks, et al., "Measuring Coding Challenge Competence With APPS", In Repository of arXiv:2105.09938v1, May 20, 2021, pp. 1-16.

Ji, et al., "Question Selection for Interactive Program Synthesis", In Proceedings of the 41st ACM SIGPLAN Conference on Programming Language Design and Implementation, Jun. 15, 2020, pp. 1143-1158.

Jin, et al., "Auto-Transform: Learning-to-Transform by Patterns", In Proceedings of the VLDB Endowment, vol. 13, Issue 12, Jul. 1, 2020, pp. 2368-2381.

Jin, et al., "Foofah: Transforming Data by Example", In Proceedings of the ACM International Conference on Management of Data, May 14, 2017, pp. 683-698.

Kandel, et al., "Wrangler: Interactive Visual Specification of Data Transformation Scripts", In Proceedings of SIGCHI Conference on Human Factors in Computing Systems, May 7, 2011, pp. 3363-3372.

Kery, et al., "mage: Fluid Moves Between Code and Graphical Work in Computational Notebooks", In Proceedings of the 33rd Annual ACM Symposium on User Interface Software and Technology, Oct. 20, 2020, pp. 140-151.

Lai, et al., "Ds-1000: A natural and reliable benchmark for data science code generation", In Repository of arXiv:2211.11501v1, Nov. 18, 2022, 26 Pages.

Lee, et al., "Deconstructing categorization in visualization recommendation: A taxonomy and comparative study", In Journal of IEEE Transactions on Visualization and Computer Graphics, vol. 28, Issue 12, Dec. 1, 2022, pp. 4225-4239.

Lee, et al., "Lux: always-on visualization recommendations for exploratory dataframe workflows", In Repository of arXiv:2105.00121v1, Apr. 30, 2021, 15 Pages.

Li, et al., "Competition-level code generation with AlphaCode", In Journal of Science, vol. 378, Issue 6624, Dec. 8, 2022, 74 Pages.

Liu, et al., "Atlas: Grammar-based Procedural Generation of Data Visualizations", In Proceedings of IEEE Visualization Conference (VIS), Oct. 24, 2021, pp. 171-175.

Liu, et al., "Data Illustrator: Augmenting Vector Design Tools with Lazy Data Binding for Expressive Visualization Authoring", In Proceedings of the CHI Conference on Human Factors in Computing Systems, Apr. 21, 2018, pp. 1-13.

Luo, et al., "Natural Language to Visualization by Neural Machine Translation", In Journal of IEEE Transactions on Visualization and Computer Graphics ( vol. 28, Issue: 1, Jan. 2022, pp. 217-226.

Moritz, et al., "Formalizing Visualization Design Knowledge as Constraints: Actionable and Extensible Models in Draco", In Journal of IEEE Transactions on Visualization and Computer Graphics, vol. 25, Issue 1, Jan. 2019, pp. 438-448.

Ouyang, et al., "Training language models to follow instructions with human feedback", In Proceedings of 36th Conference on Neural Information Processing Systems, Nov. 28, 2022, 15 Pages.

(56)                References Cited

OTHER PUBLICATIONS

Poesia, et al., "Synchromesh: Reliable code generation from pre-trained language models", In repository of arXiv:2201.11227v1, Jan. 26, 2022, pp. 1-19.

Polozov, et al., "Flashmeta: A framework for inductive program synthesis", In Proceedings of the ACM SIGPLAN International Conference on Object-Oriented Programming, Systems, Languages, and Applications, Oct. 25, 2015, pp. 107-126.

Pu, et al., "Semanticon: Specifying content-based semantic conditions for web automation programs", In Proceedings of the 35th Annual ACM Symposium on User Interface Software and Technology, Oct. 29, 2022, pp. 1-16.

Raman, et al., "Potter's wheel: An interactive data cleaning system", In Proceedings of the 27th International Conference on Very Large Data Bases, Sep. 11, 2001, 10 Pages.

Ren, et al., "Charticulator: Interactive Construction of Bespoke Chart Layouts", In Journal of IEEE transactions on visualization and computer graphics vol. 25, Issue 1, Aug. 20, 2018, pp. 789-799.

Ren, et al., "Reflecting on the Evaluation of Visualization Authoring Systems : Position Paper", In Proceedings of IEEE Evaluation and Beyond—Methodological Approaches for Visualization (BELIV), Oct. 21, 2018, pp. 86-92.

Saket, et al., "Visualization by Demonstration: An Interaction Paradigm for Visual Data Exploration", In Journal of IEEE Transactions on Visualization and Computer Graphics, Jan. 2017, pp. 331-340.

Satyanarayan, et al., "Critical Reflections on Visualization Authoring Systems", In Journal of IEEE Transactions on Visualization and Computer Graphics, vol. 26, Issue 1, Aug. 16, 2019, pp. 461-471.

Satyanarayan, et al., "Lyra: An Interactive Visualization Design Environment", In Computer Graphics Forum, vol. 33, Jul. 12, 2014, 10 Pages.

Satyanarayan, et al., "Vega-Lite: A grammar of interactive graphics", In Journal of IEEE Transactions on Visualization and Computer Graphics, vol. 23, Issue 1, Jan. 2017, pp. 341-350.

Shen, et al., "GALVIS: Visualization Construction through Example-Powered Declarative Programming", In Proceedings of the 31st ACM International Conference on Information & Knowledge Management, Oct. 17, 2022, pp. 4975-4979.

Stolte, et al., "Query, Analysis, and Visualization of Hierarchically Structured Data using Polaris", In Proceedings of the eighth ACM SIGKDD international conference on Knowledge discovery and data mining, Jul. 23, 2002, pp. 112-122.

Tsandilas, Theophanis, "Structgraphics: Flexible visualization design through dataagnostic and reusable graphical structures", In Journal of IEEE Transactions on Visualization and Computer Graphics, vol. 27, Issue: 2, Feb. 2021, pp. 315-325.

Vanderplas, et al., "Altair: interactive statistical visualizations for python", In the Journal of Open Source Software, vol. 3, Issue 32, Dec. 10, 2018, 2 Pages.

Wang, et al., "Falx: Synthesis-Powered Visualization Authoring", In Proceedings of the CHI Conference on Human Factors in Computing Systems, May 8, 2021, 15 Pages.

Wang, et al., "Synthesizing highly expressive sql queries from input-output examples", In Proceedings of the 38th ACM SIGPLAN Conference on Programming Language Design and Implementation, Jun. 14, 2017, pp. 452-466.

Wang, et al., "Visualization by example", In Proceedings of the ACM on Programming Languages, vol. 4, Issue POPL, Dec. 20, 2019, 28 Pages.

Wickham, Hadley, "ggplot2", In Wiley Interdisciplinary Reviews: Computational Statistics , vol. 3 (2), Mar. 1, 2011, pp. 180-185.

Wickham, Hadley, "Tidy Data", In Journal of Statistical Software vol. 59, Issue 10, Aug. 2014, 23 Pages.

Wickham, et al., "Welcome to the tidyverse", In Journal of Open Source Software, vol. 4, Issue 43, Nov. 21, 2019, pp. 1-6.

Wilkinson, Leland, "The Grammar of Graphics, Second Edition", In Publication of Springer, 2005, 693 Pages.

Wongsuphasawat, et al., "Voyager 2: Augmenting Visual Analysis with Partial View Specifications", In Proceedings of the 2017 Chi Conference on Human Factors in Computing Systems, May 2, 2017, pp. 2648-2659.

Wongsuphasawat, et al., "Voyager: Exploratory analysis via faceted browsing of visualization recommendations", In Journal of IEEE Transactions on Visualization and Computer Graphics, vol. 22, Issue 1, Jan. 31, 2016, 10 Pages.

International Search Report and Written Opinion received for PCT Application No. PCT/US2024/033469, Sep. 23, 2024, 14 pages.

* cited by examiner

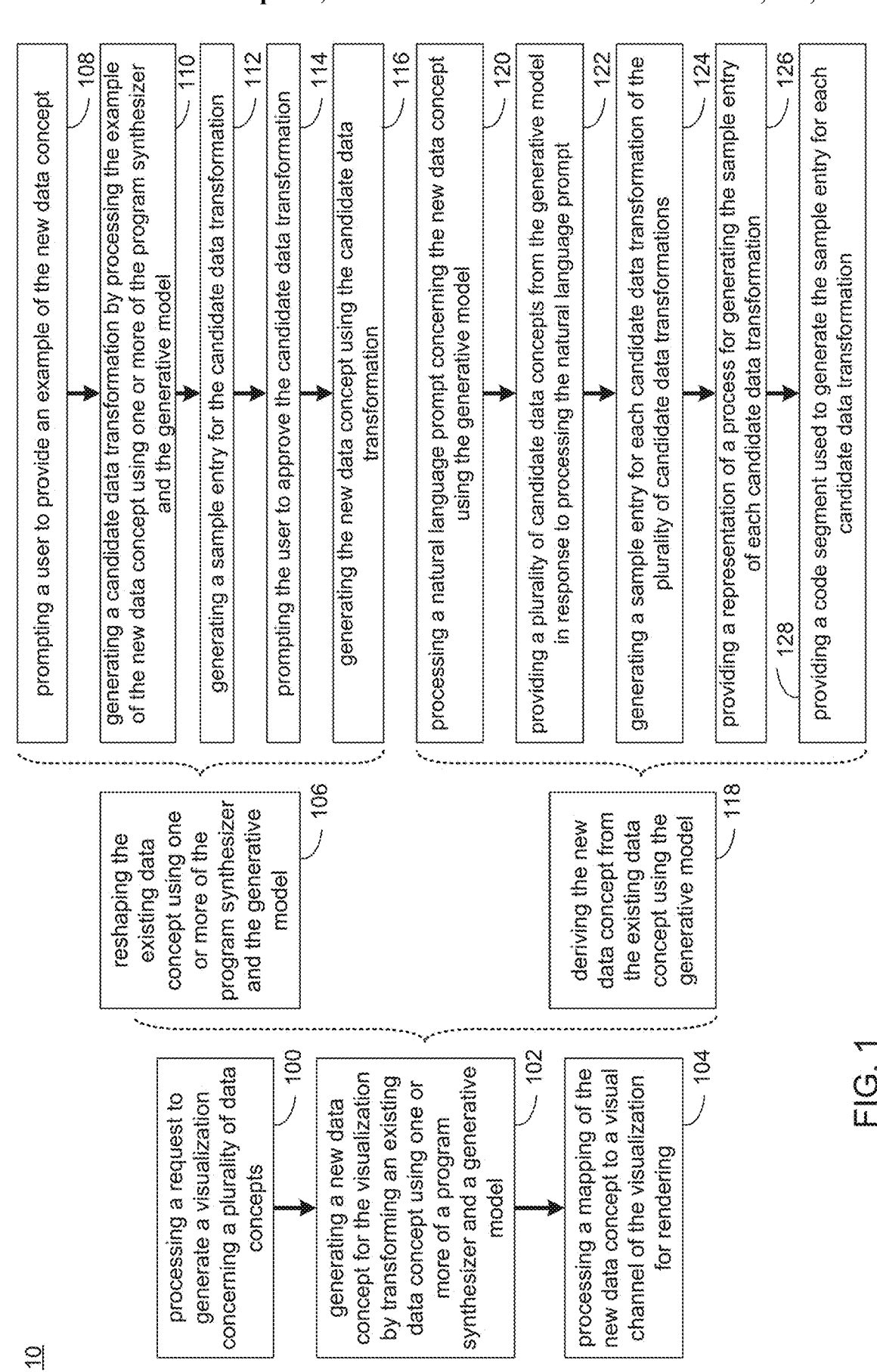

10 processing a request to generate a visualization concerning a plurality of data concepts — 100 generating a new data concept for the visualization by transforming an existing data concept using one or more of a program synthesizer and a generative model — 102 processing a mapping of the new data concept to a visual channel of the visualization for rendering — 104 reshaping the existing data concept using one or more of the program synthesizer and the generative model — 106 prompting a user to provide an example of the new data concept — 108 generating a candidate data transformation by processing the example of the new data concept using one or more of the program synthesizer and the generative model — 110 generating a sample entry for the candidate data transformation — 112 prompting the user to approve the candidate data transformation — 114 generating the new data concept using the candidate data transformation — 116 deriving the new data concept from the existing data concept using the generative model — 118 processing a natural language prompt concerning the new data concept using the generative model — 120 providing a plurality of candidate data concepts from the generative model in response to processing the natural language prompt — 122 generating a sample entry for each candidate data transformation of the plurality of candidate data transformations — 124 providing a representation of a process for generating the sample entry of each candidate data transformation — 128 providing a code segment used to generate the sample entry for each candidate data transformation — 126

FIG. 1

| Date | City | Temperature |
|------|------|-------------|
| 1/1/2020 | Seattle | 51 |
| 1/1/2020 | Atlanta | 45 |
| 1/2/2020 | Seattle | 45 |
| 1/2/2020 | Atlanta | 47 |
| 1/3/2020 | Seattle | 48 |
| 1/3/2020 | Atlanta | 56 |
| 1/4/2020 | Seattle | 47 |
| 1/4/2020 | Atlanta | 56 |
| 1/5/2020 | Seattle | 44 |
| 1/5/2020 | Atlanta | 41 |
| 1/6/2020 | Seattle | 45 |
| 1/6/2020 | Atlanta | 48 |
| 1/7/2020 | Seattle | 51 |
| 1/7/2020 | Atlanta | 53 |

| # | Atlanta | Seattle | Difference | Warmer | Date |
|---|---------|---------|------------|--------|------|
| | 410 | 412 | 800 | 802 | 200 |
| 0 | 45 | 51 | 6 | Seattle | 1/1/2020 |
| 1 | 47 | 45 | -2 | Atlanta | 1/2/2020 |
| 2 | 56 | 48 | -8 | Atlanta | 1/3/2020 |
| 3 | 56 | 47 | -9 | Atlanta | 1/4/2020 |
| 4 | 41 | 44 | 3 | Seattle | 1/5/2020 |
| 5 | 48 | 45 | -3 | Atlanta | 1/6/2020 |
| 6 | 53 | 51 | -2 | Atlanta | 1/7/2020 |

CONCEPT SHELF

NEW ⊕

— KNOWN DATA CONCEPTS —

1 2 3   ATLANTA  45, 47, 56

1 2 3   SEATTLE  51, 45, 48 ...

1 2 3   SEATTLE 7-DAY AVG

A B C   WARMER   ↖ 802

1 2 3   DIFFERENCE

┌ DERIVED FROM ─────────┐        ┌ CONCEPT NAME * ─────┐
│  SEATTLE, ATLANTA    ▽ │   →    │   DIFFERENCE        │
└───────────────────────┘        └─────────────────────┘

PROMPT TO DESCRIBE THE TRANSFORMATION

CALCULATE THE DIFFERENCE BETWEEN
SEATTLE AND ATLANTA

GENERATED TRANSFORMATION ON SAMPLE DATA:

| SEATTLE TEMP | ATLANTA | DIFFERENCE |
|---|---|---|
| 51 | 45 | 6 |
| 45 | 47 | -2 |
| 48 | 56 | -8 |

④

🗑  CANCEL  SAVE

AI-POWERED CONCEPT-DRIVEN VISUALIZATION AUTHORING

BACKGROUND

With many visualization tools, users or "authors" are often required to transform their data into particular formats to create desired visualizations. For example, various visualization tools provide options for visualizations to represent different characteristics or features of a data set. However, the data set is typically defined within, or provided to, the visualization tool in a particular format. When the data set formatting is incompatible with a particular visualization's formatting inputs, or when it is unclear how a data set can be transformed to represent a different feature of the data set, the user would need specialized programs or separate data processing tools to modify the data set.

BRIEF DESCRIPTION OF THE DRAWINGS

FIG. 1 is a flow chart of one implementation of the data transformation process;

FIG. 2 is a diagrammatic view of an existing data table according to an implementation of the data transformation process of FIG. 1;

FIG. 8 is a diagrammatic view of a new data table according to an implementation of the data transformation process of FIG. 1;

FIGS. 9-11 are diagrammatic views of the data transformation process of FIG. 1.

Like reference symbols in the various drawings indicate like elements.

DETAILED DESCRIPTION OF THE PREFERRED EMBODIMENTS

Figure 3:
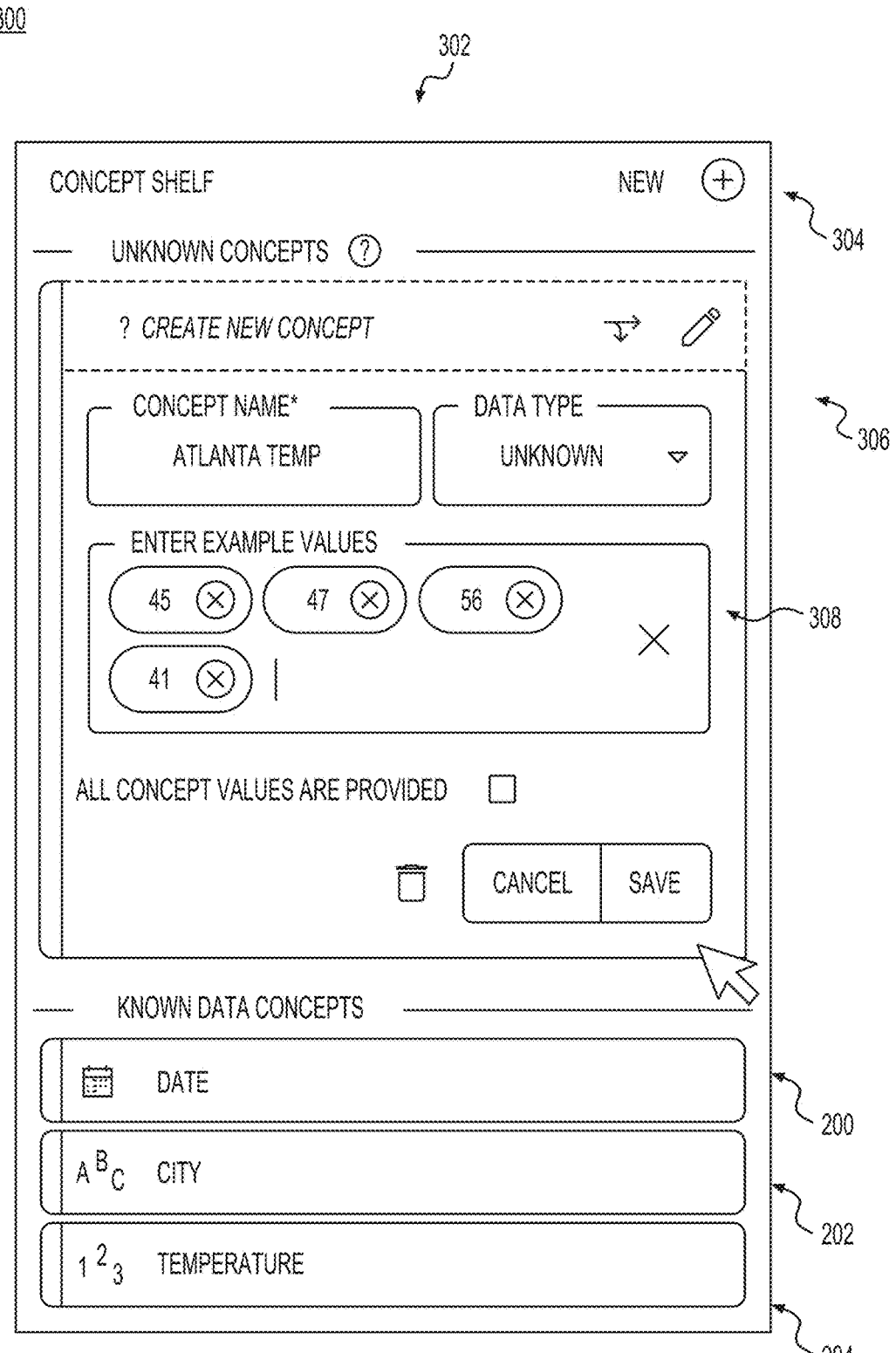
FIGS. 3-7 are diagrammatic views of the data transformation process of FIG. 1.

Embodiments of the present disclosure allow for an AI-powered visualization paradigm that separates high-level visualization intents and low-level data transformation steps, leveraging a program synthesizer and/or a generative multimodal model. For example, embodiments of the present disclosure provide an interactive visualization authoring tool where users define data concepts they plan to visualize using natural languages or examples from existing data concepts, and then bind them to visual channels. The program synthesizer and/or the generative multimodal model automatically transforms the input data to create these new data concepts from existing data concepts and to generate the desired visualizations. When presenting the results (i.e., a transformed table and output visualizations) from the program synthesizer and/or the generative multimodal model, feedback is also provided to help users inspect and understand the process for transforming existing data concepts to new data concepts in order to create a desired visualization of the new data concept.

The details of one or more embodiments are set forth in the accompanying drawings and the description below. Other features and advantages will become apparent from the description, the drawings, and the claims.

The Data Transformation Process:

As will be discussed in greater detail below, embodiments of the present disclosure allow for a fundamentally different approach for visualization authoring by leveraging an AI agent (e.g., a program synthesizer or a generative multimodal model). For example, data transformation process 10 separates the high-level visualization intent (i.e., "what to visualize") from the low-level data transformation steps (i.e., "how to format data to visualize") and automates the latter to resolve data transformation burdens. Using a program synthesizer and/or a generative multimodal model, data transformation process 10 works with a user to determine the intent for, and characteristics of, a new data concept, and provides candidate data transformation(s). In this manner, a natural language description or user-sample for a new data concept is processed by a program synthesizer and/or a generative multimodal model to generate candidate data transformations with a description of the process used to generate sample entries for the new data concept. Accordingly, and in contrast to requiring a user to resort to bespoke programs or external data processing software, data transformation process 10 integrates the capabilities of program synthesizers and/or generative multimodal models to generate candidate data transformations with information about how the candidate data transformation is defined (e.g., how a new data concept processes inputs from two existing data concepts).

Referring to FIGS. 1-11, data transformation process 10 processes 100 a request to generate a visualization concerning a plurality of data concepts. A new data concept for the visualization is generated 102 by transforming an existing data concept using a program synthesizer or a generative multimodal model. The new data concept is mapped 104 to a visual channel of the visualization for rendering.

In some embodiments, data transformation process 10 processes 100 a request to generate a visualization concerning a plurality of data concepts. A data concept is an abstraction of a data set that includes related portions of data (e.g., multiple temperature readings for the same location). For example, a collection of sequential or periodic dates defines a "date" data concept. In another example, a collection of temperature values for a particular location defines a "temperature" data concept. In this manner, data concepts can be generated from any combination of related data set(s). In one example, data concepts are represented in a table as individual columns.

A visualization is a visual representation of one or more data concepts to describe one or more characteristics of the associated data concepts. For example, suppose a data concept includes a list of temperatures of a city observed over time. In this example, a visualization can be generated to represent the variability in the temperature over time in a graph (e.g., a line plot with temperature as a function of time). Generally, visualizations within visualization authoring tools have predefined or preformatted inputs (i.e., an input data format to yield a desired result). As will be discussed in greater detail below, to eliminate a user's burden to manually transform data concepts before rendering the desired visualization, data transformation process 10 allows a user to generate new data concepts by transforming existing data concepts using a program synthesizer and/or a generative multimodal model.

Referring also to FIG. 2 and in some embodiments, suppose a user has input data within a visualization tool. In addition to dedicated visualization authoring tools, various software applications provide visualization functionality (e.g., presentation applications, spreadsheet applications, data analytics applications, etc.). As such, it will be appreciated that a request to generate a visualization of data concepts may be provided by, or processed using, many types of software applications. Returning to the above example, data transformation process 10 populates existing data concepts: date (e.g., date data concept 200); city (e.g., city data concept 202); and temperature (e.g., temperature data concept 204). Now suppose a user desires to generate a visualization using these data concepts. In this example, the user selects a visualization type (e.g., "scatter plot") and maps these data concepts to visual channels; then data transformation process 10 generates the desired scatter plot. As the data concepts in this example are already available in the formatting of the desired visualization (e.g., the scatter plot), no data transformation is needed.

Now suppose a user desires to generate a visualization comparing the temperatures of different cities. In this example, to generate a scatter plot of the temperatures of each city (e.g., Seattle and Atlanta), the temperatures of each city need to be mapped to the x-axis and the y-axis of the scatter plot. As the temperatures of Seattle and Atlanta are not available yet as data concepts in the format needed for the scatter plot (i.e., a column of temperature values for Seattle and a column of temperature values for Atlanta), data transformation process 10 processes 100 a request to generate a visualization concerning a plurality of data concepts.

In some embodiments, data transformation process 10 generates 102 a new data concept for the visualization by transforming an existing data concept using a program synthesizer and/or a generative multimodal model. A program synthesizer is a software engine configured to construct a program or generate code that probably satisfies a given high-level formal specification. For instance, given an example relation E, with input data T, the program synthesizer solves the programming-by-example problem to find a reshaping program p such that $E \subseteq p(T)$ (i.e., the transformed data concept should generalize the existing example E).

In some embodiments, a generative multimodal model is a machine learning model that uses neural networks to identify patterns and structures within multiple types of data sets (i.e., different data modalities) to generate new data. For example and as will be discussed in greater detail below, the generative multimodal model is configured to receive prompts and/or example entries and/or contextual information concerning the visualization and the existing data concepts to generate candidate data transformations for the new data concept. In one example, the generative multimodal model is provided with a natural language prompt to generate candidate data transformations for the new data concept. In another example, the generative model is provided with multimodal inputs (i.e., images, sounds, speech, video, segments of code, etc.) to generate candidate data transformations for the new data concept. Accordingly, it will be appreciated that the generative multimodal model can process various types of data to generate candidate data transformations within the scope of the present disclosure. In this manner, a generative multimodal model can process a prompt with a single data modality (e.g., natural language) or multiple modalities (e.g., natural language and images).

In one example, the generative multimodal model includes a transformer-based Large Language Model (LLM). An LLM is a language model consisting of a neural network with many parameters (typically billions of weights or more), trained on large quantities of unlabeled text using self-supervised learning or semi-supervised learning. Though trained on simple tasks along the lines of predicting the next word in a sentence, LLMs with sufficient training and parameter counts capture the syntax and semantics of human language. In addition, LLMs demonstrate considerable general knowledge and are able to "memorize" a great quantity of facts during training. In some embodiments, with a transformer architecture, the LLMs are composed of attention blocks. An attention block is a portion of the generative multimodal model that allows the model to account for global context information within a prompt with particular emphasis on past prompt portions by focusing "attention" on more important prompt portions and lessening "attention" on less important prompt. This attention is represented as a weighting applied to the various prompt portions. In some embodiments, the generative multimodal model is a Multimodal Large Language Model. Examples of LLMs include BLOOM from BigScience, Codex from OpenAI®, and GPT-4 from OpenAI®.

In another example, the generative multimodal model includes a diffusion-based generative multimodal model. A diffusion-based generative multimodal model define a Markov chain of diffusion steps to slowly add random noise to data and then learn to reverse the diffusion process to construct desired data samples from the noise.

In some embodiments, the program synthesizer and/or the generative multimodal model are deployed in a cloud system where client computing devices provide prompts to the generative multimodal model or inputs to the program synthesizer within the cloud system. In this example, the cloud system deployment of the program synthesizer and/or the generative multimodal model use the storage and computing resources of the cloud system for processing prompts from client devices, the cloud system, and/or other cloud systems. In some embodiments, the program synthesizer and/or the generative multimodal model are deployed on a client computing device that has sufficient storage and computing resources to process prompts for the program synthesizer and/or the generative multimodal model. Accordingly, it will be appreciated that the program synthesizer and/or the generative multimodal model can be deployed using various local or remote computing devices.

In some embodiments, the program synthesizer and/or the generative multimodal model is able to process the request to generate a new data concept for a visualization. As will be described in greater detail below, generating 102 the new data concept using program synthesizer and/or the generative multimodal model includes performing various types of transformations including, but not limited to, deriving a new data concept and/or reshaping an existing data concept(s) using generative multimodal model.

In some embodiments, the generative multimodal model provides recommendations for data concepts of interest and/or visualizations of interest based on the data context or author interaction history. For example, data transformation process 10 provides information concerning the data concepts and author interaction history to the program synthesizer and/or the generative multimodal model to obtain recommendations for visualizations based on all potentially relevant data concepts. In this manner, data transformation process 10 overcomes the limitation of users being unable to view designs beyond their input data columns without additional user intervention.

In some embodiments, data transformation process 10 uses the program synthesizer and/or the generative multimodal model to determine how to transform existing data concept(s) to a new data concept. For example and as will be discussed in greater detail below, transforming existing data concepts to new data concepts includes reshaping the existing data and/or deriving the new data concept from the existing data. As each approach is unique, a user may be unaware of which approach will yield a desired data concept. As such, data transformation process 10 addresses this challenge by covering both reshaping (e.g., table-level reshaping operators) and derivation (e.g., column-level derivation operators). For example, pivoting a data concept from wide to long may be expressed by a "concept merge" operator that combines multiple data concepts into their names and values. A natural language interface is provided so that the user can initiate an interaction in natural language. Based on the description, the program synthesizer and/or the generative multimodal model will decide whether to ask for an example relation (e.g., if reshaping is needed) or to generate derivation codes. In this manner, data transformation process 10 shifts the effort of deciding which approach to use for transforming the existing data concepts from the user to the program synthesizer and/or the generative multimodal model.

Reshaping Existing Data Concepts

In some embodiments, generating 102 the new data concept for the visualization includes reshaping 106 the existing data concept using a program synthesizer and/or the generative multimodal model. Reshaping an existing data concept includes modifying the layout or properties of an existing data concept to generate a new data concept. In the example above where a user is interested in generating a scatter plot of the temperatures of each city (e.g., Seattle and Atlanta), where the temperatures of each city are mapped to the x-axis and the y-axis of the scatter plot, the existing data concepts (e.g., city data concept 202 and temperature data concept 204) are incompatible with the formatting requirements of the desired visualization. Accordingly, data transformation process 10 generates 102 a new data concept (e.g., a new data concept for temperatures of Atlanta over time and a new data concept for temperatures of Seattle over time) by reshaping 106 city data concept 202 and temperature data concept 204 using a program synthesizer and/or the generative multimodal model.

For example and referring again to FIG. 3, data transformation process 10 provides a user interface (e.g., user interface 300) showing a data concept shelf (e.g., concept shelf 302) with features for generating a new data concept. In this example, a user clicks the "new" button (e.g., button 304) in user interface 300, which opens a concept card (e.g., concept card 306) that prompts the user to name the new concept. In the example of FIG. 3, suppose the user enters "Atlanta Temp" to represent the temperatures for the city of Atlanta.

In some embodiments, reshaping 106 the existing data concept includes prompting 108 a user to provide an example of the new data concept. For example, in addition to the name of the new data concept, data transformation process 10 prompts 108 the user to provide one or more example values for the new data concept. As shown in FIG. 3, suppose the user provides four Atlanta temperatures (e.g., 45, 47, 56, 41) in box 310 from the input data as examples.

Figure 4:
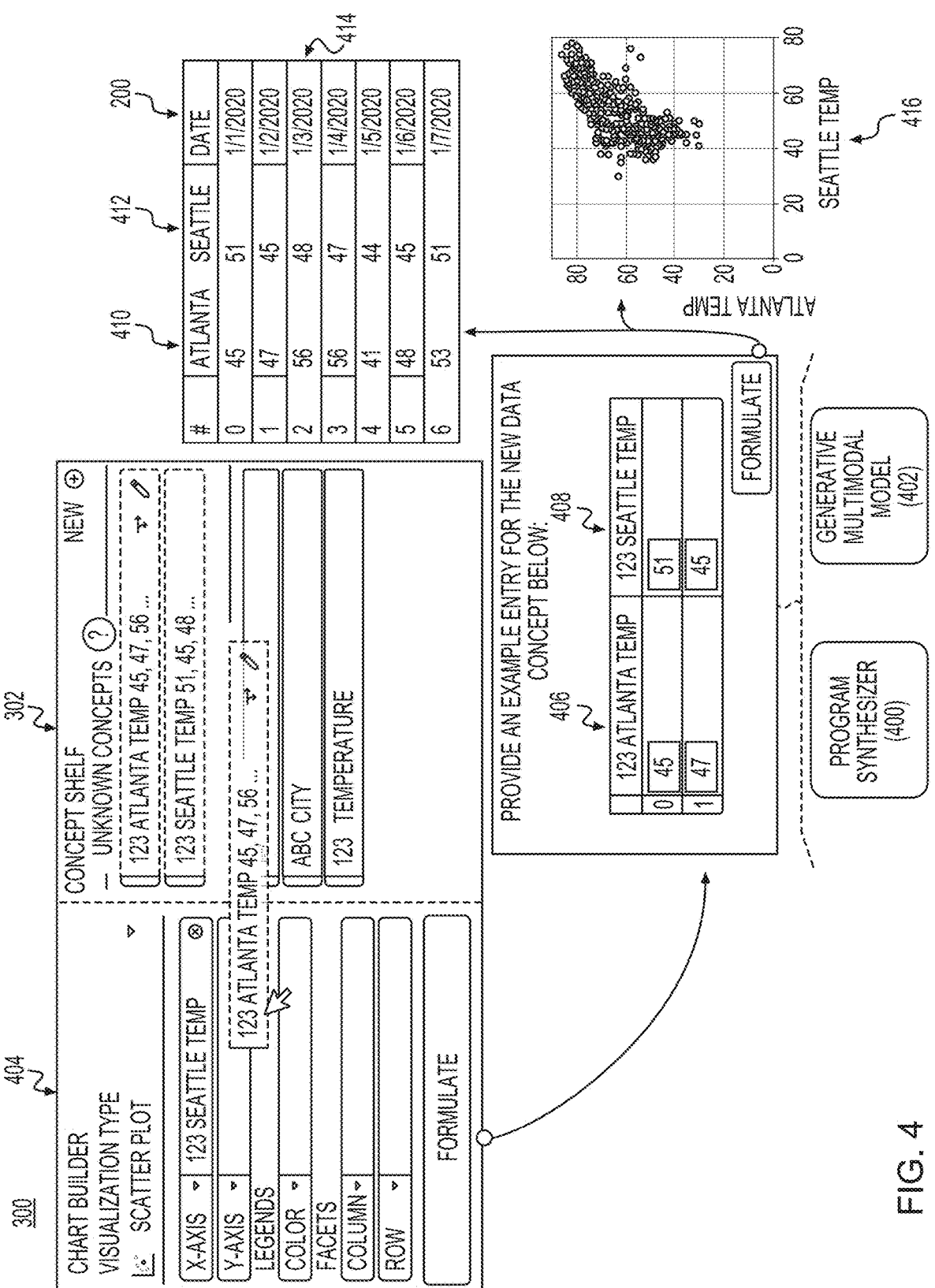

Referring also to FIG. 4, suppose the user creates another new concept "Seattle Temp" with sample values 51, 45, 48, 47 in a similar manner as described above for "Atlanta Temp". In this example, data transformation process 10 generates a new data concept for "Atlanta Temp" and a new data concept for "Seattle Temp" with the limited information provided by the user (e.g., example values). As will be discussed in greater detail below, data transformation process 10 resolves this lack of information by using a program synthesizer (e.g., program synthesizer 400) and/or a generative multimodal model (e.g., generative multimodal model 402) to reshape 106 an existing data entry, or combination of existing data entries, to generate 102 the new data concepts.

In some embodiments, reshaping 106 the existing data concept includes generating 110 a candidate data transformation by processing the example of the new data concept using a program synthesizer and/or the generative multimodal model. Continuing with the above example and as shown in FIG. 4, suppose a user selects the scatter plot visualization from chart builder 404 and drags the "Seattle Temp" to the x-axis visual channel and the "Atlanta Temp" to the y-axis visual channel. In some embodiments, generating 110 a candidate data transformation includes prompting the user to provide an example of a relationship between the new data concept and other data concepts (i.e., existing data concepts or other new data concepts). For example, as shown in FIG. 4, data transformation process 10 provides a table with a candidate data transformation for the Atlanta Temp data concept (e.g., candidate data transformation 406) compared with a candidate data transformation for the Seattle Temp data concept (e.g., candidate data transformation 408). In this example, data transformation process 10 receives user input to provide an example relationship between temperatures in Atlanta relative to temperatures in Seattle (e.g., "45" for Atlanta has a relationship with "51" for Seattle as the respective temperature for a particular day). Accordingly, data transformation process 10 prompts the user to provide one or more examples of how the new data concept relates to existing data concepts or other new data concepts.

With the limited information provided by the user, data transformation process 10 generates 110 a candidate data transformation for the Atlanta Temp data concept relative to the Seattle Temp data concept. As it is unspecified how each entry of Atlanta Temp data concept and Seattle Temp data concept relate to one another, data transformation process 10 generates 110 a candidate data transformation for the Atlanta Temp data concept (e.g., candidate data transformation 406) compared with a candidate data transformation for the Seattle Temp data concept (e.g., candidate data transformation 408) using program synthesizer 400 and/or generative multimodal model 402. For example, program synthesizer 400 compares Atlanta Temp data concept 402 and Seattle Temp data concept 408 to determine potential relationships between them and to provide recommendations for data concepts that reshape date data concept 200, city data concept 202, and/or temperature data concept 204.

In some embodiments, reshaping 106 the existing data concept includes generating 112 a sample entry for the candidate data transformation. Referring again to FIG. 4, a program synthesizer 400 and/or generative multimodal model 402 populates the candidate data table with the sample entries provided by the user and/or generated by a program synthesizer and/or generative multimodal model 402. In this manner, a program synthesizer and/or generative multimodal model 402 determines how to transform the entries of date data concept 200, city data concept 202, and/or temperature data concept 204 to generate the Atlanta Temp data concept and the Seattle Temp data concept.

In some embodiments, data transformation process 10 prompts a user to confirm and/or provide additional example entries to the candidate data table. For example and as shown in FIG. 4, data transformation process 10 prompts the user with an example table to complete with sample entries for Atlanta Temp data concept 410 and Seattle Temp data concept 412 where each row in the example table will be a data point in the desired scatter plot. In this example, the user provides two sample entries from the input data to guide program synthesizer 400 and/or generative multimodal model 402 on how to generate this transformation of Atlanta Temp data concept 410 and Seattle Temp data concept 412 from date data concept 200, city data concept 202, and/or temperature data concept 204. Specifically in this example, suppose the user provides the temperatures of Atlanta and Seattle on Jan. 1, 2020 and Jan. 2, 2020 from the table shown in FIG. 2.

In some embodiments, reshaping 106 the existing data concept includes prompting 114 the user to approve the candidate data table. For example, data transformation process 10 prompts 114 the user to approve the candidate data table with the generated sample entries. Continuing with the above example, when the entries generated by program synthesizer 400 or generative multimodal model 402 are approved, program synthesizer 400 or generative multimodal model 402 infers a program that can transform the remaining input data to generate a new table with fields Atlanta Temp and Seattle Temp that subsumes the example table provided by the user.

In some embodiments, in response to the user approving the candidate data table, data transformation process 10 generates 116 the new data concept using the candidate data table. For example, with the approved candidate data table, data transformation process 10 generates a table 414 with Atlanta Temp data concept 410 and Seattle Temp data concept 412. As will be discussed in greater detail below, data transformation process 10 processes 104 a mapping of Seattle Temp data concept 412 to the x-axis visual channel and Atlanta Temp data concept 410 to the y-axis visual channel. The desired visualization (e.g., scatter plot 416) is rendered using the new data concept (e.g., Atlanta Temp data concept 410 and Seattle Temp data concept 412).

Deriving New Data Concepts

In some embodiments, generating 102 the new data concept for the visualization includes deriving 118 the new data concept from the existing data concept using the generative multimodal model. Deriving 118 a new data concept from an existing data concept includes defining one or more existing data concepts as a basis for generating the new data concept. For example, suppose a user desires a bar chart and a histogram to visualize temperature differences between Atlanta and Seattle. In this example, two new data concepts will be used. The first new data concept defines the difference in temperature between each city for the same day and the second new data concept identifies the warmer city based on the temperature. In this example, data transformation process 10 receives a request from the user to derive both of these new data concepts from existing fields based on column-wise mappings.

Figure 5:
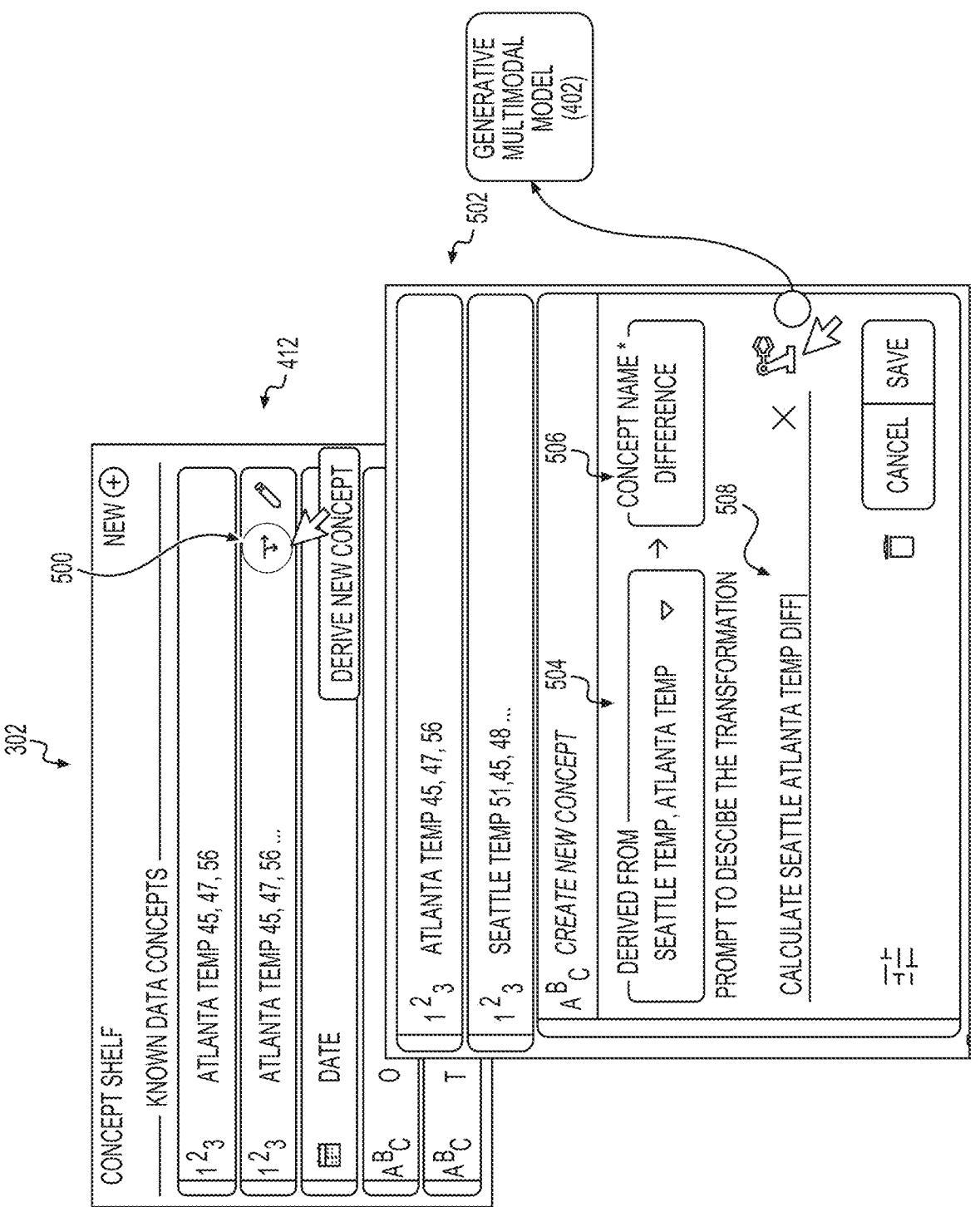

Referring also to FIG. 5, a user selects an existing data concept (e.g., Seattle Temp data concept 412) from concept shelf 302 of user interface 300 and selects an icon (e.g., derive icon 500) indicative of the "derive" functionality of data transformation process 10. This opens up a concept card (e.g., concept card 502) that prompts the user to describe the transformation for the existing data concept using natural language.

For example, concept card 502 includes a portion for creating a new data concept by deriving 120 the new data concept from an existing data concept. In this example, data transformation process 10 prompts a user to provide the existing data concept from which the new data concept will be derived (e.g., using field 504), a name for the new data concept (e.g., in name box 506), and a natural language description of the functionality of the new data concept. The natural language description is provided in a text field (e.g., text field 508). For example, suppose the user selects Atlanta Temp data concept 410 and Seattle Temp data concept 412 as the "derived from" data concepts, provides a name "Difference" for the new concept, and describes the transform using natural language, "Calculate Seattle Atlanta temp diff."

In some embodiments, deriving 118 the new data concept includes processing 120 a natural language prompt concerning the new data concept using the generative multimodal model. For example, with the natural language description (e.g., "Calculate Seattle Atlanta temp diff"), data transformation process 10 generates a contextualized prompt that grounds the description in the context of the existing data concepts (e.g., Atlanta Temp data concept 410 and Seattle Temp data concept 412). This prompt combines the user's description and the descriptions of input parameters for all source data concepts (with example values sampled from their domains) and joins it with the function prefix to instruct generative multimodal model 402 to complete a function (e.g., a function, as opposed to generating non-code text or uncontrolled code snippets). In one example, generative multimodal model 402 generates a TypeScript function for the candidate data transformations. In some embodiments, data transformation process 10 provides the prompt to generative multimodal model 402 asking for at least one candidate data transformation. In one example, data transformation process 10 requests a predefined number of candidate data transformations (e.g., five candidate data transformations).

Figure 6:
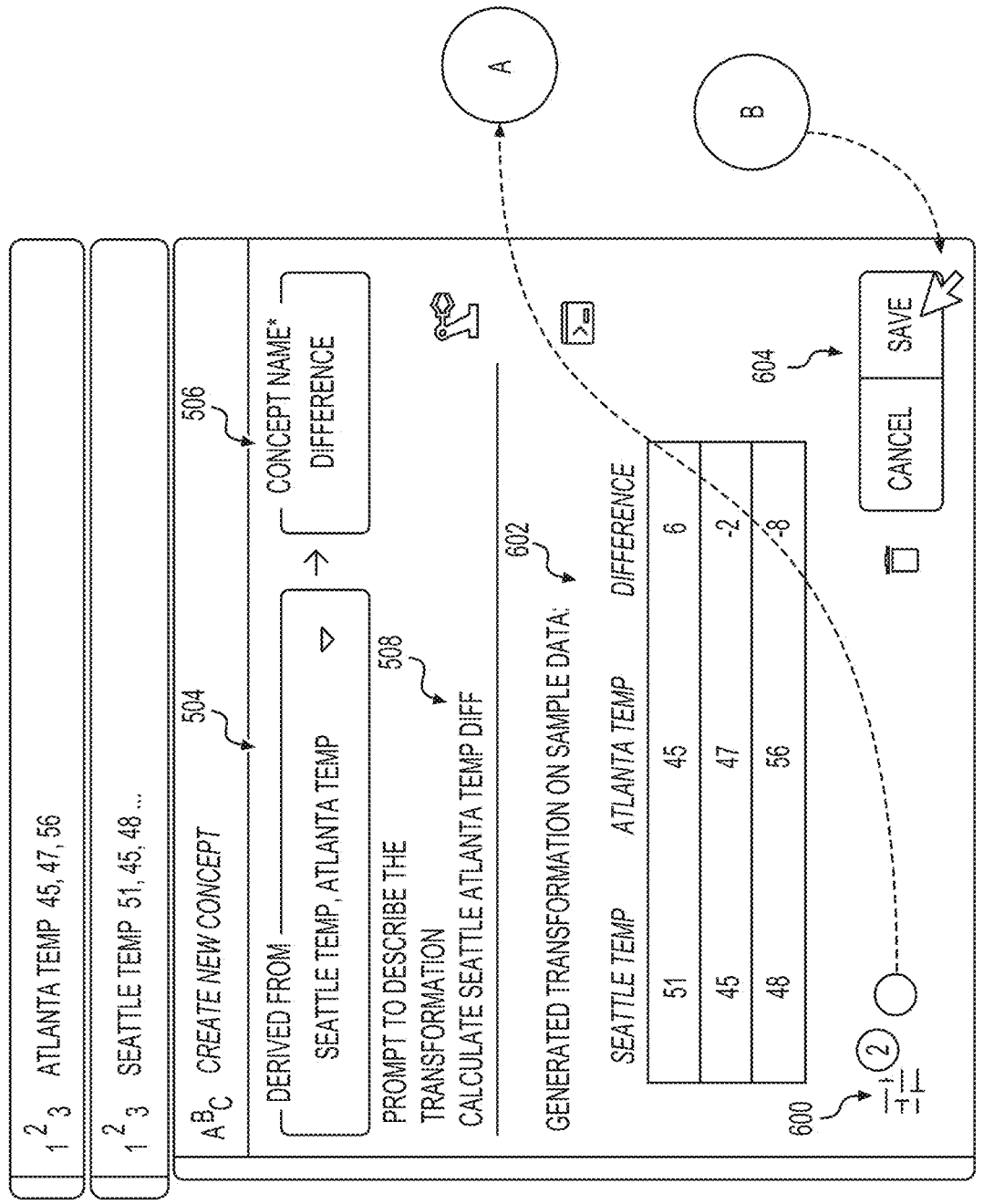
Figure 7:
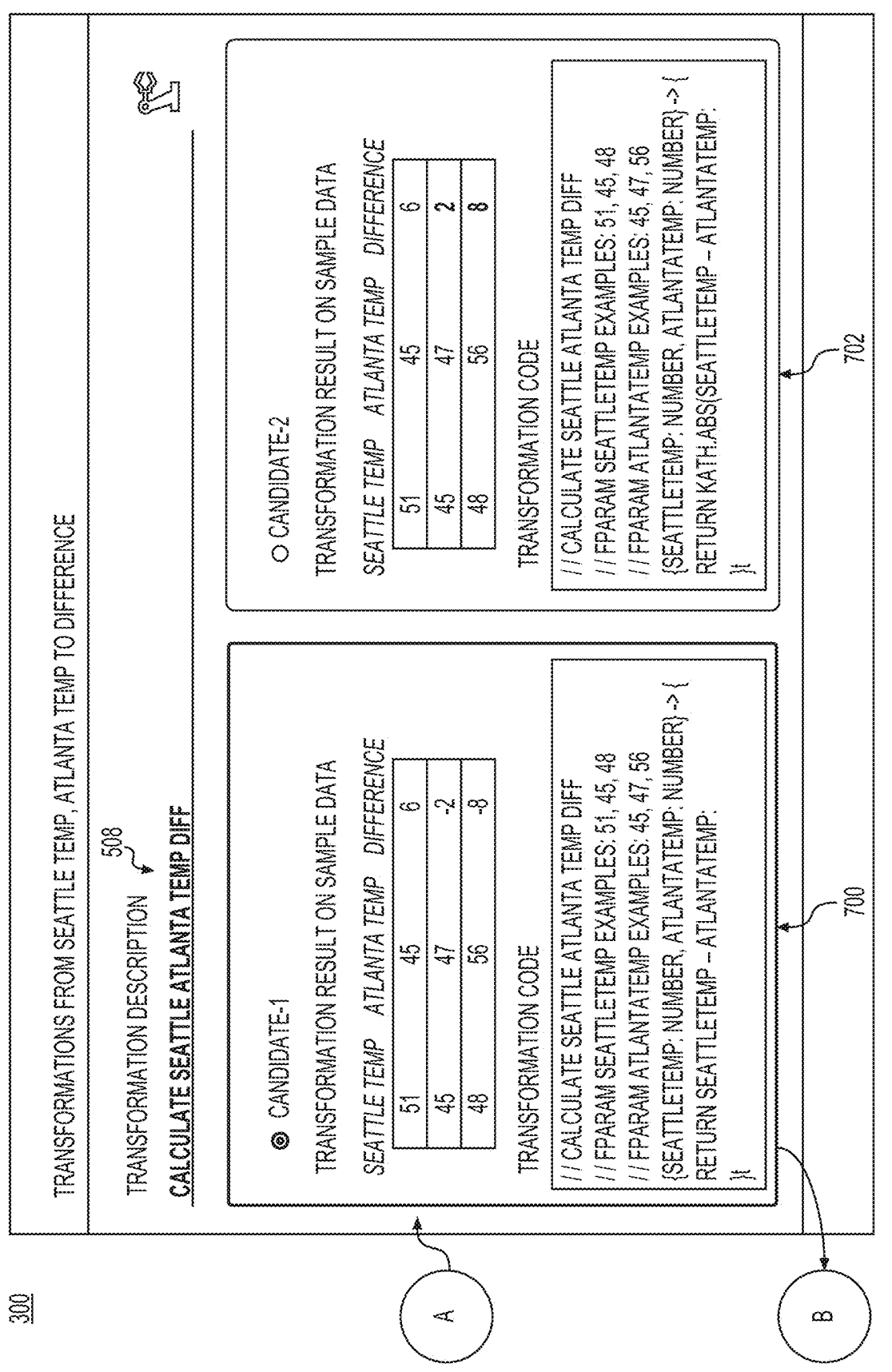
Figure 10:
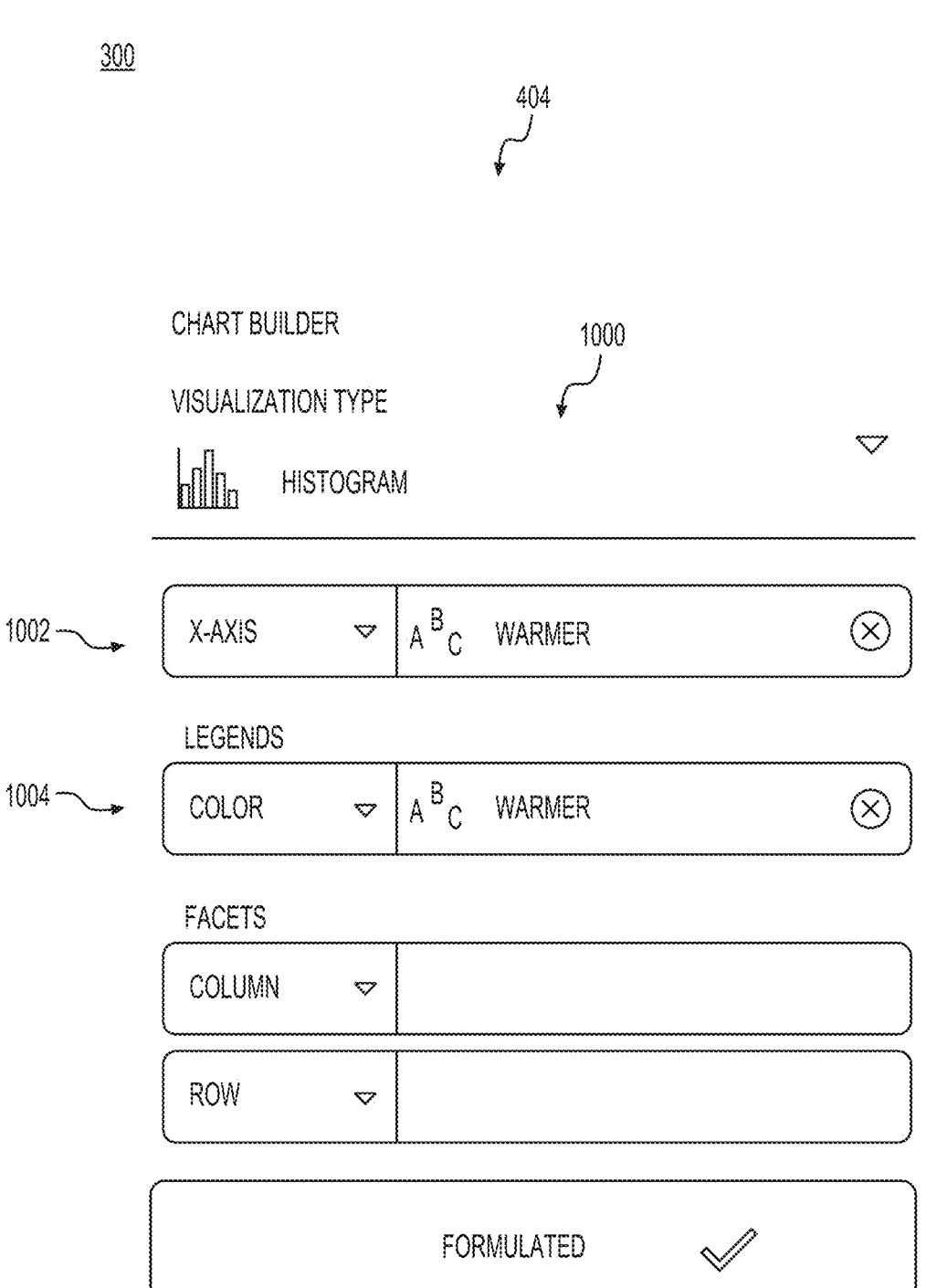

In some embodiments, deriving 118 the new data concept includes providing 122 a plurality of candidate data transformations from the generative multimodal model in response to processing the natural language prompt. For example, data transformation process 10 processes candidate data transformations received from generative multimodal model 402 by filtering codes that are not executable or contain error outputs by executing them on sample values from source domains. Referring also to FIG. 6, data transformation process 10 provides 122 the plurality of candidate data transformations from generative multimodal model along with example execution results so that the user can inspect. As shown in FIG. 6, data transformation process 10 represents the plurality of candidate data transformations using an icon or other indicator (e.g., icon 600) that, when selected, transitions the user to the user interface window shown in FIG. 7. This transition is shown by the dashed arrow from icon 600 to the symbol "A" in FIGS. 6-7.

In some embodiments, deriving 118 the new data concept includes generating 124 a sample entry for each candidate data transformation of the plurality of candidate data transformations. As shown in FIG. 6, data transformation process 10 generates 124 a sample entry (e.g., sample entry 602) for a candidate data transformation. In this example, the sample entries for Difference data concept are 6, −2, and −8.

In some embodiments, deriving 118 the new data concept includes providing 126 a representation of a process for generating the sample entry of each candidate data transformation of the plurality of candidate data transformations. In one example, a representation of the process for generating the sample entry includes a natural language description of how each entry is generated. In another example, the representation of the process includes a sample visualization of the steps taken to generate the sample entry. In another example, and as will be discussed in greater detail below, the representation includes a code segment or pseudo-code segment associated with the candidate data transformation used to generate the sample entry. By inspecting the sample entry and the representation of the process for generating the sample entry provided by data transformation process 10, a user can understand how the candidate data transformation generates its entries and whether the candidate data transformation is consistent across various input entries from the source data concept(s).

In some embodiments, providing 126 a representation of a process for generating the sample entry of each candidate data transformation includes providing 128 a code segment used to generate the sample entry for each candidate new data transformation of the plurality of candidate data transformations. Referring again to FIG. 6, suppose data transformation process 10 provides 126 two candidate data transformations from generative multimodal model 402 and the user, upon inspecting sample entry 602, selects icon 600 to inspect a representation of the process for generating the sample entry. In this example and referring also to FIG. 7, data transformation process 10 provides 128 a code segment for each candidate data transformation (e.g., code segment 700 for a first candidate data transformation and code segment 702 for a second candidate data transformation). In some embodiments, data transformation process 10 provides example entries generated for each candidate data transformation. For example, with the first candidate data transformation, the difference sample entries are shown as 6, −2 and −8 while, with the second candidate data transformation, the difference sample entries are shown as 6, 2, and 8. As shown in code segment 702, the second candidate data transformation returns an absolute value for the difference result. In this example, suppose that the user selects the first candidate data transformation associated with code segment 700. Once confirmed, data transformation process 10 transitions the user to the user interface window shown in FIG. 6. This transition is shown by the dashed arrow to the symbol "B" in FIGS. 6-7. With the selected candidate data transformation, the user confirms the details for the new data concept by selecting the save button (e.g., save button 604). The Difference data concept is saved to concept shelf 304 for use in mapping to visual channels.

Suppose that the user creates another new data concept, Warmer, from Seattle Temp and Atlanta Temp with the channel of the visualization for rendering the visualization. A visual channel is a portion of a visualization that is used to populate the visualization with data from the data concept. For example, in a scatter plot, visual channels include the x-axis and the y-axis. Visual channels also include other portions such as the coloring or labeling of the data concepts represented in a visualization. Processing 104 a mapping of a data concept to a visual channel includes providing the entries of the data concept as inputs to the particular visual channel. In the example of a scatter plot, the Atlanta Temp data concept is mapped (e.g., by a user) to the x-axis and the Seattle Temp data is mapped 104 to the y-axis to compare the temperatures of Atlanta to those of Seattle.

Returning to the above example, suppose the user desires to render a histogram indicating the number of days each city is warmer than the other, or if they have the same temperature. Referring to FIGS. 8-11, data transformation process 10 provides user interface 300 with concept shelf 302 where a user selects (e.g., via dragging and dropping) data concepts from the plurality of data concepts to the visual channels of the visualization. Specifically, the user selects the type of visualization (e.g., Histogram 1000) shown in chart builder 400 of FIG. 10 and selects Warmer data concept 802 in concept shelf 302 of FIG. 9 and maps it to the x-axis visual channel (e.g., x-axis visual channel 1002). In this example, data transformation process 10 processes 104 the mapping of Warmer data concept 802 to the color visual channel (e.g., color visual channel 1004) such that Warmer data concept 802 is represented in a visualization as color visual channel 1004.

In some embodiments, with the data concepts mapped to visual channels, a visualization can be rendered by generating a visualization specification. In one example, data transformation process 10 generates a Vega-Lite specification (i.e., a visualization description as encoding mappings from data to properties of graphical marks (e.g., points or bars)). An example of a Vega-Lite specification generated by data transformation process 10 for the scatter plot shown in FIG. 4 is shown below:

```
{ "mark": "circle", "encoding" : { "x": {"field": "Date", "type": "temporal"}, "y":
{"field",→ : "Temperature", "type": "quantitative"}, "color": {"field": "City"} } }
{ "mark": "circle", "encoding" : { "x": {"field": "Seattle Temp", "type":
,→ "quantitative"}, "y": {"field": "Atlanta Temp", "type": "quantitative"} } }
``` description "check which city is warmer, Atlanta, Seattle, or same" in a similar manner as described above for the Difference data concept. In this example, data transformation process 10 applies the data transformation on top of the derived table from the last task and displays the extended table as shown in FIG. 8 with Difference data concept 800 and Warmer data concept 802. From the table, the user can visually inspect each entry for each data concept. With these new data concepts transformed from existing data concepts, data transformation process 10 allows a user to generate the histogram visualization in the formatting defined for the particular visualization without manually modifying the existing data concepts. As discussed above, with generative multimodal model 402, data transformation process 10 allows the user to describe the nature of the new data concepts to either reshape 106 or derive 118 them from existing data concepts.

Rendering the Visualization with the New Data Concept

Figure 11:

In some embodiments, data transformation process 10 processes 104 a mapping of the new data concept to a visual In some embodiments, when all fields used in the visual encoding are available, data transformation process 10 combines the visualization specification with the input data to render the visualization as shown in FIG. 11. When some data concepts are unknown or unresolved, data transformation process 10 interacts with the user to transform the input table before combining it with the visualization specification.

As shown in FIG. 11, a visualization (e.g., visualization 1100) is rendered by representing the number of days that Atlanta is warmer than, or at the same temperature as, Seattle. Data transformation process 10 saves previous or recommended visualizations (e.g., visualizations 1102, 1104, 1106) for a user to access or modify, as desired. In some embodiments, data transformation process 10 employs different approaches for transformation of existing data concepts into new data concepts (e.g., for derivation and reshaping). Data transformation process 10 combines the advantages of both approaches so that the user can better communicate their intent with the program synthesizer and/ or the generative multimodal model, and the program synthesizer and/or generative multimodal model can provide precise solutions from a more expressive program space.

System Overview

Figure 12:
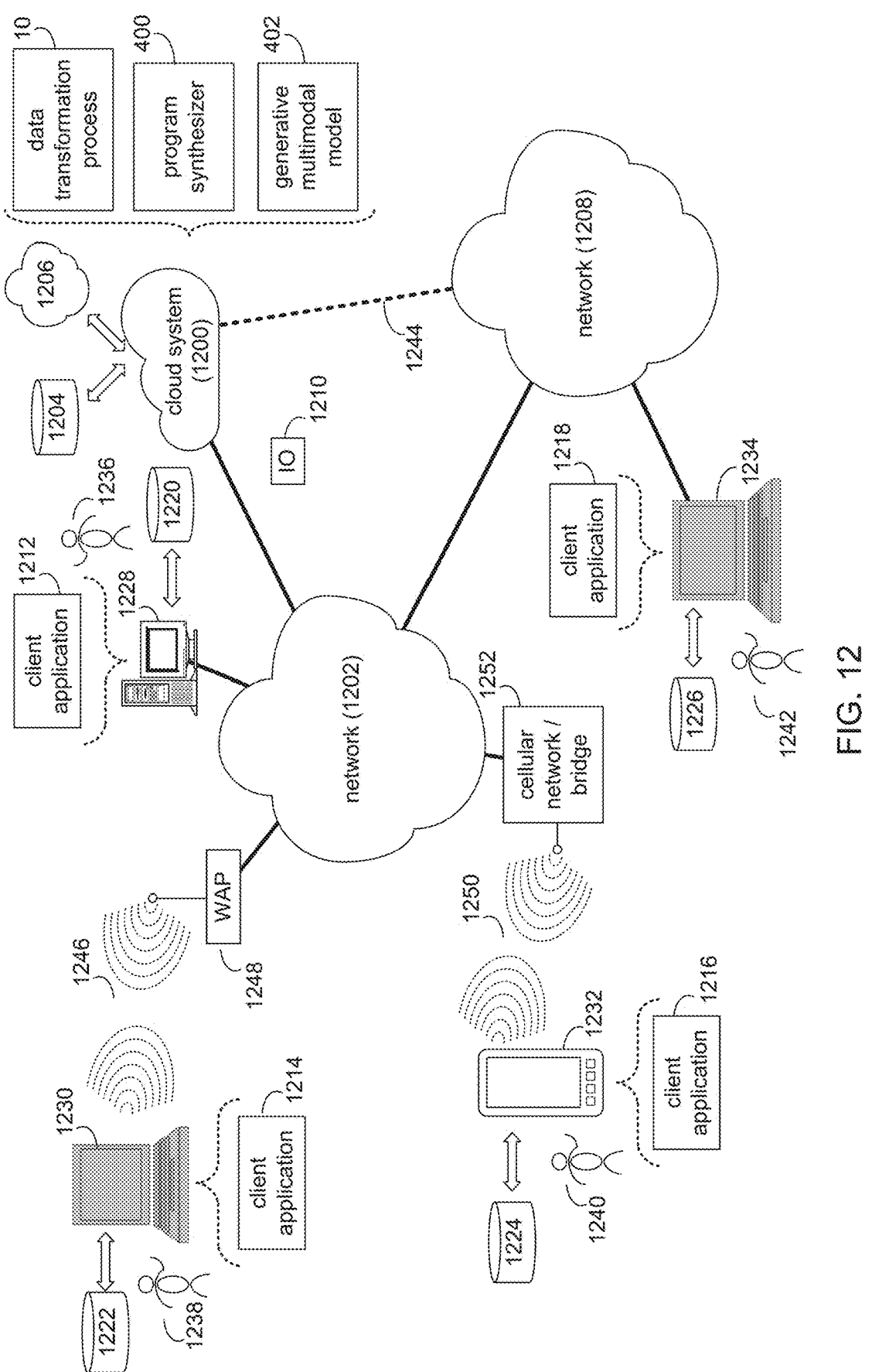
FIG. 12 is a diagrammatic view of computer system and a data transformation process coupled to a distributed computing network.

Referring to FIG. 12, a data transformation process 10 is shown to reside on and is executed by cloud system 1200, which is connected to network 1202 (e.g., the Internet or a local area network). Examples of cloud system 1200 include: a cloud-based device with a memory system, a cloud Network Attached Storage (NAS) system, a Storage Area Network (SAN), a personal computer with a memory system, and a server computer with a memory system. A SAN includes one or more of a personal computer, a server computer, a series of server computers, a minicomputer, a mainframe computer, a RAID device, and a NAS system.

The various components of cloud system 1200 execute one or more operating systems. The instruction sets and subroutines of data transformation process 10, which are stored on cloud storage device 1204 included within cloud system 1200, are executed by one or more processors (not shown) and one or more memory architectures (not shown) included within cloud system 1200. Cloud storage device 1204 may include: a hard disk drive; an optical drive; a RAID device; a random-access memory (RAM); a read-only memory (ROM); and all forms of flash memory storage devices. Additionally or alternatively, some portions of the instruction sets and subroutines of data transformation process 10 are stored on storage devices (and/or executed by processors and memory architectures) that are external to cloud system 1200. Cloud system 1200 uses cloud computing resources (e.g., cloud computing resources 1206) to process requests on cloud system 1200. Cloud computing resources 1206 include processing units (e.g., central processing units (CPUs), graphic processing units (GPUs), etc.), memory devices, In some embodiments, network 1202 is connected to one or more secondary networks (e.g., network 1208), examples of which include: a local area network; a wide area network; or an intranet.

Various input/output (IO) requests (e.g., IO request 1210) are sent from client applications 1212, 1214, 1216, 1218 to cloud system 1200. Examples of IO request 1210 include data write requests (e.g., a request that content be written to cloud system 1200) and data read requests (e.g., a request that content be read from cloud system 1200).

The instruction sets and subroutines of client applications 1212, 1214, 1216, 1218 which may be stored on storage devices 1220, 1222, 1224, 1226 (respectively) coupled to client electronic devices 1228, 1230, 1232, 1234 (respectively), may be executed by one or more processors (not shown) and one or more memory architectures (not shown) incorporated into client electronic devices 1228, 1230, 1232, 1234 (respectively). Storage devices 1220, 1222, 1224, 1226 may include: hard disk drives; tape drives; optical drives; RAID devices; random access memories (RAM); read-only memories (ROM), and all forms of flash memory storage devices. Examples of client electronic devices 1228, 1230, 1232, 1234 include personal computer 1228, laptop computer 1230, smartphone 1232, laptop computer 1234, a server (not shown), a data-enabled, and a dedicated network device (not shown). Client electronic devices 1228, 1230, 1232, 1234 each execute an operating system.

Users 1236, 1238, 1240, 1242 may access cloud system 1200 directly through network 1202 or through secondary network 1208. Further, cloud system 1200 may be connected to network 1202 through secondary network 1208, as illustrated with link line 1244.

The various client electronic devices may be directly or indirectly coupled to network 1202 (or network 1208). For example, personal computer 1228 is shown directly coupled to network 1202 via a hardwired network connection. Further, laptop computer 1234 is shown directly coupled to network 1208 via a hardwired network connection. Laptop computer 1230 is shown wirelessly coupled to network 1202 via wireless communication channel 1246 established between laptop computer 1230 and wireless access point (e.g., WAP) 1248, which is shown directly coupled to network 1202. WAP 1248 may be, for example, an IEEE 802.11a, 802.11b, 802.11g, 802.11n, Wi-Fi®, and/or Bluetooth® device that is capable of establishing a wireless communication channel 1246 between laptop computer 1230 and WAP 1248. Smartphone 1232 is shown wirelessly coupled to network 1202 via wireless communication channel 1250 established between smartphone 1232 and cellular network/bridge 1252, which is shown directly coupled to network 1202.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible embodiments of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative embodiments, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:

processing a request to generate a visualization concerning a plurality of data concepts, wherein each of the data concepts comprises related portions of data of a data set;

generating a new data concept by transforming an existing data concept from the plurality of data concepts using a program synthesizer and a generative machine learning model, wherein generating the new data concept includes deriving the new data concept from the existing data concept using the generative machine learning model by:

processing a natural language prompt concerning the new data concept using the generative machine learning model;

providing a plurality of candidate data transformations from the generative machine learning model based on at least the natural language prompt and an author interaction history;

generating a sample entry for each candidate data transformation of the plurality of candidate data transformations; and providing a representation of a process for generating the sample entry of each candidate data transformation by providing a code segment used to generate the sample entry of each candidate data transformation of the plurality of candidate data transformations; and generating a visualization of the new data concept by processing a mapping of the new data concept to a visual channel of the visualization of the new data concept for rendering.

2. The computer-implemented method of claim 1, wherein generating the new data concept for the visualization includes reshaping the existing data concept using one or more of the program synthesizer and the generative machine learning model.

3. The computer-implemented method of claim 2, wherein reshaping the existing data concept includes prompting a user to provide an example of the new data concept.

4. The computer-implemented method of claim 3, wherein reshaping the existing data concept includes generating a candidate data transformation by processing the example of the new data concept using one or more of the program synthesizer and the generative machine learning model.

5. A computing system comprising:

a memory; and a processor configured to process a request to generate a visualization concerning a plurality of data concepts in a table, wherein each of the data concepts comprises related portions of data of a data set, to generate a new data concept from the plurality of data concepts for the visualization by deriving the new data concept from an existing data concept using a generative machine learning model, wherein deriving the new data concept includes: processing a natural language prompt concerning the new data concept using the generative machine learning model, providing a plurality of candidate data transformations from the generative machine learning model in response to processing the natural language prompt, generating a sample entry for each candidate data transformation of the plurality of candidate data transformations, providing a representation of a process for generating the sample entry of each candidate data transformation by providing a code segment used to generate the sample entry of each candidate data transformation of the plurality of candidate data transformations, and generating the new data concept by processing a selection of a candidate data transformation to transform the existing data concept, and to generate a visualization of the new data concept by processing a mapping of the new data concept to a visual channel of the visualization of the new data concept for rendering.

6. The computing system of claim 5, wherein the generative machine learning model includes one or more of:

a transformer-based multimodal Large Language Model (LLM); or a diffusion-based generative multimodal model.

7. A storage device for storing a computer program product residing on a computer readable medium having a plurality of instructions stored thereon which, when executed by a processor, cause the processor to perform operations comprising:

processing a request to generate a visualization concerning a plurality of data concepts in a table, wherein each of the data concepts comprises related portions of data of a data set;

generating a new data concept for the visualization by reshaping an existing data concept from the plurality of data concepts using a program synthesizer and a generative machine learning model, wherein generating the new data concept includes deriving the new data concept from the existing data concept using the generative machine learning model by:

processing a natural language prompt concerning the new data concept using the generative machine learning model;

providing a plurality of candidate data transformations from the generative machine learning model based on at least the natural language prompt and an author interaction history;

generating a sample entry for each candidate data transformation of the plurality of candidate data transformations; and providing a representation of a process for generating the sample entry of each candidate data transformation by providing a code segment used to generate the sample entry of each candidate data transformation of the plurality of candidate data transformations; and generating a visualization of the new data concept by processing a mapping of the new data concept to a visual channel of the visualization of the new data concept for rendering.

8. The computer program product of claim 7, wherein the candidate data transformation includes a candidate data table.

* * * * *